C. B. AUEL AND D. C. PULTNEY.
SAFETY GUARD FOR MACHINE TOOLS.
APPLICATION FILED NOV. 18, 1916.

1,308,027.

Patented July 1, 1919.

INVENTORS
Carl B. Auel &
David C. Pultney.

C. B. AUEL AND D. C. PULTNEY.
SAFETY GUARD FOR MACHINE TOOLS.
APPLICATION FILED NOV. 18, 1916.

1,308,027.

Patented July 1, 1919.
2 SHEETS—SHEET 2.

WITNESSES:

INVENTOR
Carl B. Auel &
David C. Pultney.
BY
ATTORNEY

UNITED STATES PATENT OFFICE.

CARL B. AUEL AND DAVID C. PULTNEY, OF WILKINSBURG, PENNSYLVANIA, ASSIGNORS TO WESTINGHOUSE ELECTRIC AND MANUFACTURING COMPANY, A CORPORATION OF PENNSYLVANIA.

SAFETY-GUARD FOR MACHINE-TOOLS.

1,308,027.  Specification of Letters Patent.  Patented July 1, 1919.

Application filed November 18, 1916. Serial No. 132,083.

*To all whom it may concern:*

Be it known that we, CARL B. AUEL, a citizen of the United States, and a resident of Wilkinsburg, in the county of Allegheny and State of Pennsylvania, and DAVID C. PULTNEY, a citizen of the United States, and a resident of Wilkinsburg, in the county of Allegheny and State of Pennsylvania, have invented a new and useful Improvement in Safety-Guards for Machine-Tools, of which the following is a specification.

Our invention relates to safety devices for machine tools and the like, and it has for its object to provide a simple and effective guard for wood-planing machines and similar machine tools which shall be associated with the usual work guide of the machine in such manner as to effectually cover the inactive portion of the moving tool at all times without interfering with the necessary adjustment of the guide.

Figure 1:
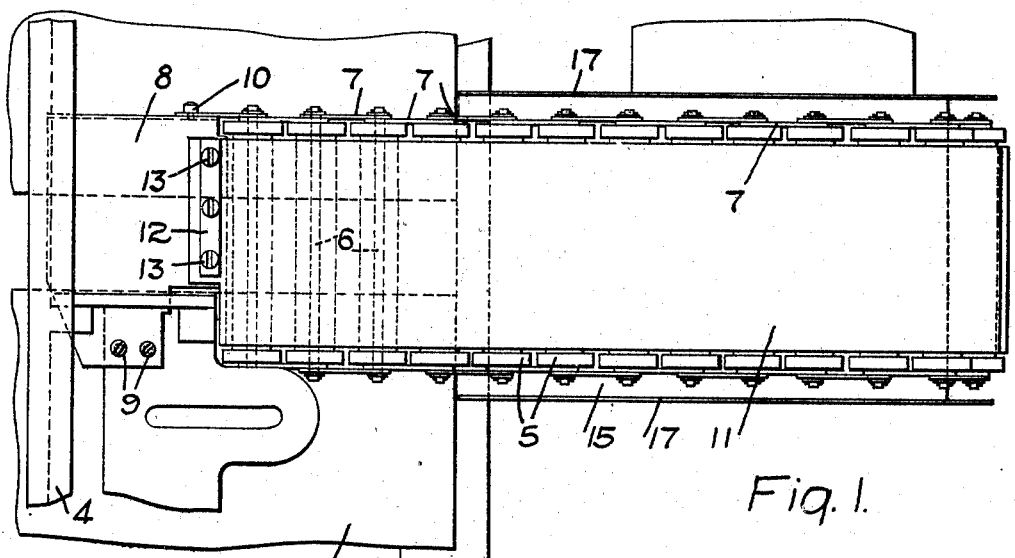
Figure 2:
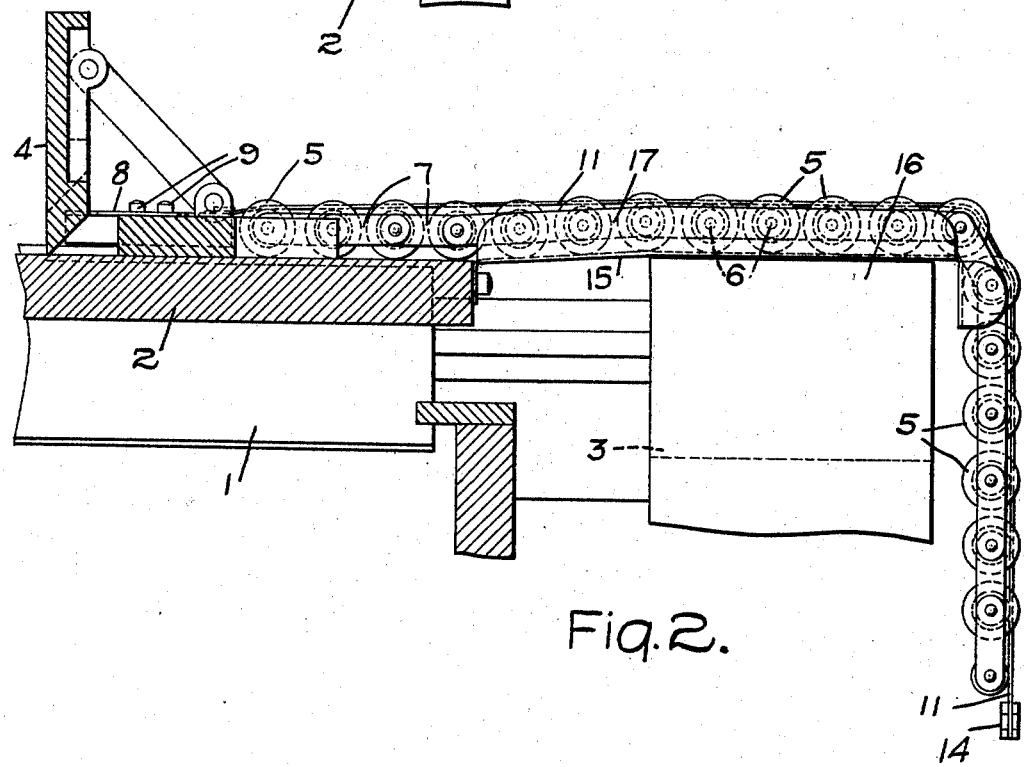
Figure 3:
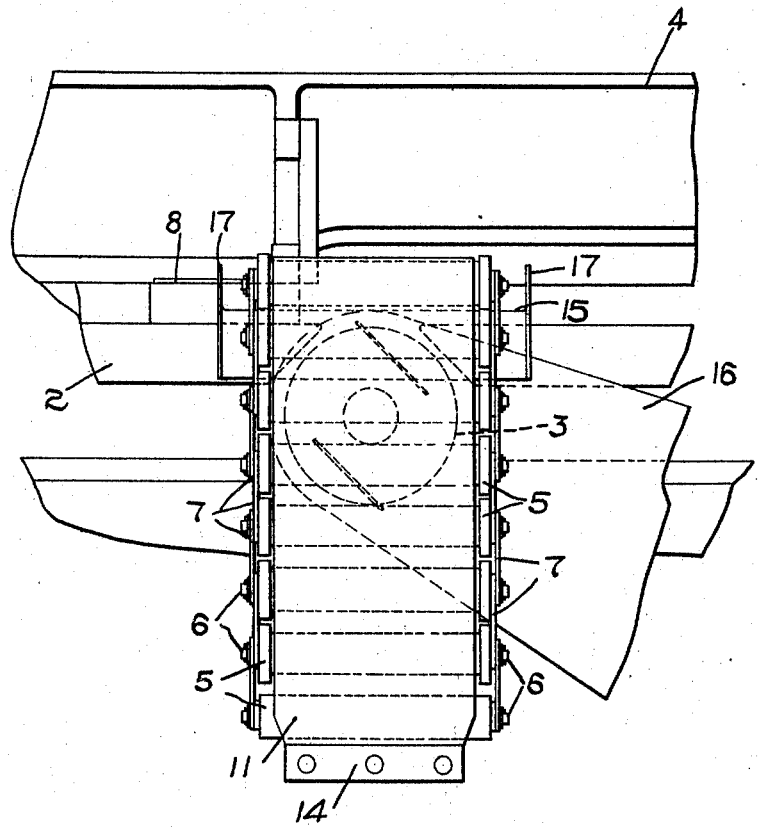

In the accompanying drawing, Figure 1 is a partial plan view of a wood-planing machine provided with a guard constructed in accordance with our invention, Fig. 2 is an end elevational view of the structure shown in Fig. 1, and Fig. 3 is a rear elevational view of the same structure.

The planing machine shown in the drawing comprises a rotary planer drum 1 mounted in suitable bearings beneath a table 2 and driven by means of a pulley 3 from any suitable source of power. The periphery of the drum 1 projects slightly above the table 2, as is usual in machines of this type. A vertical guide plate 4 extends across the planer drum 1 and is adjustably supported upon the table 1 in any usual manner, the direction of adjustment of the guide plate being such that it is maintained across, and perpendicular to, the axis of the planer drum 1.

In the operation of the planer tool, the work is placed upon the table at the left of, and in engagement with, the guide plate 4, and the portion of the planer drum 1 at the right of the guide 4 is entirely inactive and is a source of danger to the operator of the machine as well as to other persons. In order to effectually cover this part of the planer drum and the driving pulley associated with it, we provide a guard consisting of a series of parallel, flanged rollers or spools 5 which are rotatably carried by rods 6. The ends of the rods 6 extend through openings in overlapping flat links 7 which serve to flexibly connect the rollers together.

One end of the set of rollers just described hangs freely beyond the pulley 3, as shown in Fig. 2, and the other end is attached to the rear of the guide plate 4 in any suitable manner, so that the guard moves with the guide plate and conforms automatically to changes in its position. As shown, a sheet metal housing 8 is secured, by means of screws 9 or otherwise, to the rear horizontal portion of the guide 4, and the ends of the chains formed by the links 7 are secured to the housing 8 by means of screws 10 or in any other suitable manner. The particular method of attaching the rollers to the guide will be varied in accordance with the different structures of the guides in various machines to which our invention is applied.

An apron 11 of leather or other flexible sheet material extends over the rollers or spools 5 and is attached, at one end, to the housing 8 by means of a clamping bar 12 and screws 13. A tensioning weight 14 is attached to the outer depending end of the apron 11 and maintains the apron taut. As shown in Fig. 2, the guard extends not only over the planer drum 1 but over the pulley 3, being supported beyond the table 2 by means of a sheet-metal apron 15 supported upon the pulley housing 16 and provided with upturned side flanges 17 which serve to prevent undue lateral displacement of the guard rollers.

While we have shown and described a form of device which we have found to be very effective for applying our invention to actual use, it is to be understood that the specific structure herein set forth may be variously modified without exceeding the limits of our invention and that our invention is therefore to be construed as comprehending all such modifications and adaptations as fall within the scope of the appended claims.

We claim as our invention:

1. A guard for machine tools and the like comprising a series of flanged rollers flexibly connected together and a flexible apron supported upon the said rollers.

2. A guard for machine tools and the like comprising a series of flanged rollers flexibly connected together, a flexible apron supported upon the said rollers, and means for tensioning the said belt.

3. A guard for machine tools and the like comprising a series of parallel flanged rollers connected together by means of short links, and a flexible apron supported upon the said rollers.

4. A guard for machine tools and the like comprising a series of parallel flanged rollers rotatably carried by rods and connected by means of links associated with the said rods, and a flexible apron supported upon the said rollers.

5. A guard for machine tools and the like comprising a flexible apron extending over the mechanism to be protected and having one end attached to a part of the machine, and a tensioning weight attached to the other end of the said apron and hanging freely therewith.

6. A guard for machine tools and the like comprising a flexible apron supported on rollers and disposed with one end attached to an adjustable part of the machine and with its other end hanging freely over the side of the machine frame, and a tensioning weight attached to the hanging end of the said apron.

7. A planing machine comprising a table, a rotary planer tool having its periphery projecting slightly above the said table, a work guide adjustably secured to the said table and extending across the axis of the said rotary tool, a flexible guard extending above the inactive part of the said rotary tool, with one end attached to the said guide and the other end hanging freely over the edge of the said table, and a tensioning weight attached to the hanging end of the said apron.

8. A guard for machine tools and the like comprising a series of rollers flexibly connected together and a flexible apron supported upon the rollers.

9. A guard for machine tools and the like comprising a series of rollers flexibly connected together, a flexible apron supported upon the rollers, and means coöperating between the rollers and apron for maintaining the apron in place.

10. A guard for machine tools and the like comprising a plurality of flexibly connected spaced rollers having flanges at their ends to support their intermediate portions above the projecting tool when the flanges rest upon the table, and a flexible apron supported upon the rollers and retained by the flanges, the series of rollers and apron being connected to the guide.

11. A guard for machine tools and the like comprising a plurality of spaced substantially parallel members, flexible connections between the members, a flexible apron resting upon the members and means coöperating between the members and apron for maintaining the apron in place.

12. The combination with a planing machine including a table, of a plurality of spaced flexibly connected substantially parallel members, a flexible apron supported upon the members and means carried by the members operating to both support them above the table and to retain the apron in place.

In testimony whereof we have hereunto subscribed our names this 31st day of Oct., 1916.

CARL B. AUEL.
DAVID C. PULTNEY.

Copies of this patent may be obtained for five cents each, by addressing the "Commissioner of Patents, Washington, D. C."